United States Patent
Singh

(10) Patent No.: US 12,284,289 B2
(45) Date of Patent: Apr. 22, 2025

(54) METHOD TO VALIDATE APPLICATION PROGRAMMING INTERFACE (API) LEVERAGING NON FUNGIBLE TOKEN (NFT)

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 192 days.

(21) Appl. No.: 17/984,004

(22) Filed: Nov. 9, 2022

(65) Prior Publication Data

US 2024/0154814 A1     May 9, 2024

(51) Int. Cl.
*H04L 9/32* (2006.01)
*G06F 9/54* (2006.01)
*G06F 21/00* (2013.01)
*G06F 21/45* (2013.01)

(52) U.S. Cl.
CPC ............ *H04L 9/3247* (2013.01); *G06F 9/543* (2013.01); *G06F 21/45* (2013.01)

(58) Field of Classification Search
CPC .......... G06F 21/45; G06F 21/30; G06F 21/44; G06F 21/12; G06F 21/60; G06F 21/602; G06F 21/604; G06F 21/64
See application file for complete search history.

(56) References Cited

U.S. PATENT DOCUMENTS

| 8,843,997 B1 | 9/2014 | Hare |
| 10,956,244 B1 | 3/2021 | Cho |
| 2020/0344233 A1 | 10/2020 | Lai et al. |
| 2022/0109562 A1 | 4/2022 | Feola et al. |
| 2022/0245574 A1 | 8/2022 | Cella et al. |
| 2022/0318618 A1 | 10/2022 | Guntar et al. |
| 2022/0327529 A1 | 10/2022 | Williams et al. |
| 2022/0343250 A1 | 10/2022 | Tremblay et al. |
| 2022/0351195 A1 | 11/2022 | Quigley et al. |
| 2022/0383303 A1* | 12/2022 | Mullen ............... G06Q 20/389 |

(Continued)

FOREIGN PATENT DOCUMENTS

WO     2017173399 A1     10/2017

OTHER PUBLICATIONS

Dec. 5, 2020—NPL "How to implement Azure Kubernetes Service (AKS) in Cloud?," Kubernetes Advocate, pp. 13.

(Continued)

*Primary Examiner* — Edward Zee
(74) *Attorney, Agent, or Firm* — Banner & Witcoff, Ltd.

(57) ABSTRACT

An architecture is disclosed for submission and recordation of application programmer interfaces (APIs) using non-fungible tokens (NFTs) inserted into a blockchain. The API-NFT pairings are validated by nodes of the network. The system automatically searches for and generate NFTs for APIs and/or intermediate layers on a computer network based on metadata associated with the API and a hash of the API/intermediate layer. The API-NFT pair binding ensures that developers/consumers are ingesting APIs that are secure and do not include malicious rules. Furthermore, performance monitoring of the API is performed using artificial intelligence (AI) and machine learning (ML), including long short term memory (LSTM) neural networks.

20 Claims, 11 Drawing Sheets

(56) References Cited

U.S. PATENT DOCUMENTS

| | | |
|---|---|---|
| 2023/0006976 A1 | 1/2023 | Jakobsson et al. |
| 2023/0298001 A1 | 9/2023 | Jethmalani et al. |
| 2023/0353570 A1 | 11/2023 | Lee |
| 2024/0104173 A1 | 3/2024 | Tiseanu et al. |

OTHER PUBLICATIONS

May 17, 2021—NPL "High Integrity DEFI Data and Risk Stability," Credmark, pp. 23.

\* cited by examiner

METHOD TO VALIDATE APPLICATION PROGRAMMING INTERFACE (API) LEVERAGING NON FUNGIBLE TOKEN (NFT)

TECHNICAL FIELD

Aspects of the disclosure relate to blockchain management, and more specifically, to use of nonfungible tokens (NFTs) on a blockchain system for improved software development.

BACKGROUND

In the software development lifecycle (SDLC), it is commonplace to add and/or test new software modules. Application programming interfaces (APIs) simplify software development and innovation by enabling applications to exchange data and functionality easily. An API is a set of defined rules that explain how computers or applications communicate with one another. APIs sit between an application and the web server, acting as an intermediary layer that processes data transfer between systems. One risk in development (devOps) is to ensure that developers/consumer are using correct and authorized APIs.

Moreover, in SDLC, it's banal to test a software module or computer code that has been redesigned or modified due to a request from a business team or because of errors/bugs in the code. Regression testing is done to ensure the new patched code (or the modified impacted code) do not affect the existing, whole functionality in any negative way. Coordination and testing can be a daunting endeavor in the SDLC.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various devOps issues associated with software applications. One or more of the aspects herein relate to the use of blockchains to provide solutions to devOps' technological problems. Additional aspects herein relate to the integration of machine learning-based techniques into solutions to devOps' technological problems.

These and additional aspects will be appreciated with the benefit of the disclosures discussed in further detail below.

In one embodiment, a "Method to validate Application Programming Interface (API) leveraging Nonfungible Token (NFT)" is labeled as. The embodiment is directed to a novel use of NFTs that involves methods and systems that automatically search for and generate non-fungible tokens (NFTs) for application programmer interfaces (APIs)/intermediate layers on a computer network using at least two inputs: (i) associated metadata of an API, and (ii) a hash of the API/intermediate layer. The system automatically searches for API/intermediate layers on a network using an API registry 504, as illustrated in FIG. 5, which provides an API directory of API interfaces available to devOps on the network 503. Once API/intermediate layers are identified, whether on a network 503 or through a different channel, the system generates a NFT to certify the authenticity of the asset. In some examples, the creation of the NFT is for the specific, narrow purpose of binding an API (e.g., a set of defined rules for inter-communication between computers or applications; or an intermediary layer that processes data between an application and web server). The metadata of the API is associated with the API-NFT pair binding. The API-NFT pair binding is a mechanism to ensure that developers/consumers are ingesting/using APIs that are secure and do not include malicious rules.

In some embodiments, a non fungible, token base mechanism is provided to validate ownership of developed API and its service to, inter alia, ensure tamper proof API for distributed development and production environments for applications.

In some embodiments, converting an API and its associated metadata into non fungible token, which is managed by smart contract, is a multi-step process, as elaborated upon herein.

In another embodiment, a "Method to validate Application Programming Interface (API) leveraging Nonfungible Token (NFT) (Smart Contract)" is labeled as 007131.02773. The embodiment is directed to supplemental method steps that occur after generation of a repository of NFTs to not only add the NFTs to a decentralized blockchain, but to also construct a novel smart contract that enables consumers (e.g., devOps application developers) of the API to interact with the API services through API-NFT bindings. The smart contract may include a myriad of concepts including tracking monetization based on API consumption, managing API consumption in a secure manner, and/or establishing rules for parties to the smart contract. Secure, immutable, and distributed storage of information, and decentralized validation are some of the aspects that have led to increasing adoption of blockchain-based technologies across a range of application areas including in the domain of cryptocurrency and other applications. In addition, the system disclosed herein may include a smart contract based mechanism that enables consumer to onboard and/or interact with API services.

In another embodiment, a "Method to validate Application Programming Interface (API) leveraging Nonfungible Token (NFT) (NFT Orchestration System)" is labeled as 007131.02774. The embodiment is directed to an NFT orchestration system that binds/couples each NFT-API to a performance monitoring engine that measures and analyzes performance metrics (e.g., request per min., average and max latency, errors per min., API uptime, time to first hello world, memory/CPU usage, and/or the like) using artificial intelligence and/or machine learning (AI/ML) and then activate/deactivate consumer access to the API by the NFT orchestration system accordingly. For example, the NFT orchestration system may manage the smart contracts to create one or more rules to regulate the access and control of the API. The performance output may trigger the API to be deactivated when certain threshold measurements have been exceeded. In addition, the system disclosed herein may include an intelligent AI-ML mechanism to manage NFT-linked API repository based on real-time performance feed while API are consumed by consumer. In some embodiments, one or more method steps are performed for monetizing API provider services based on consumer traffic and ensuring reliability of API services.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
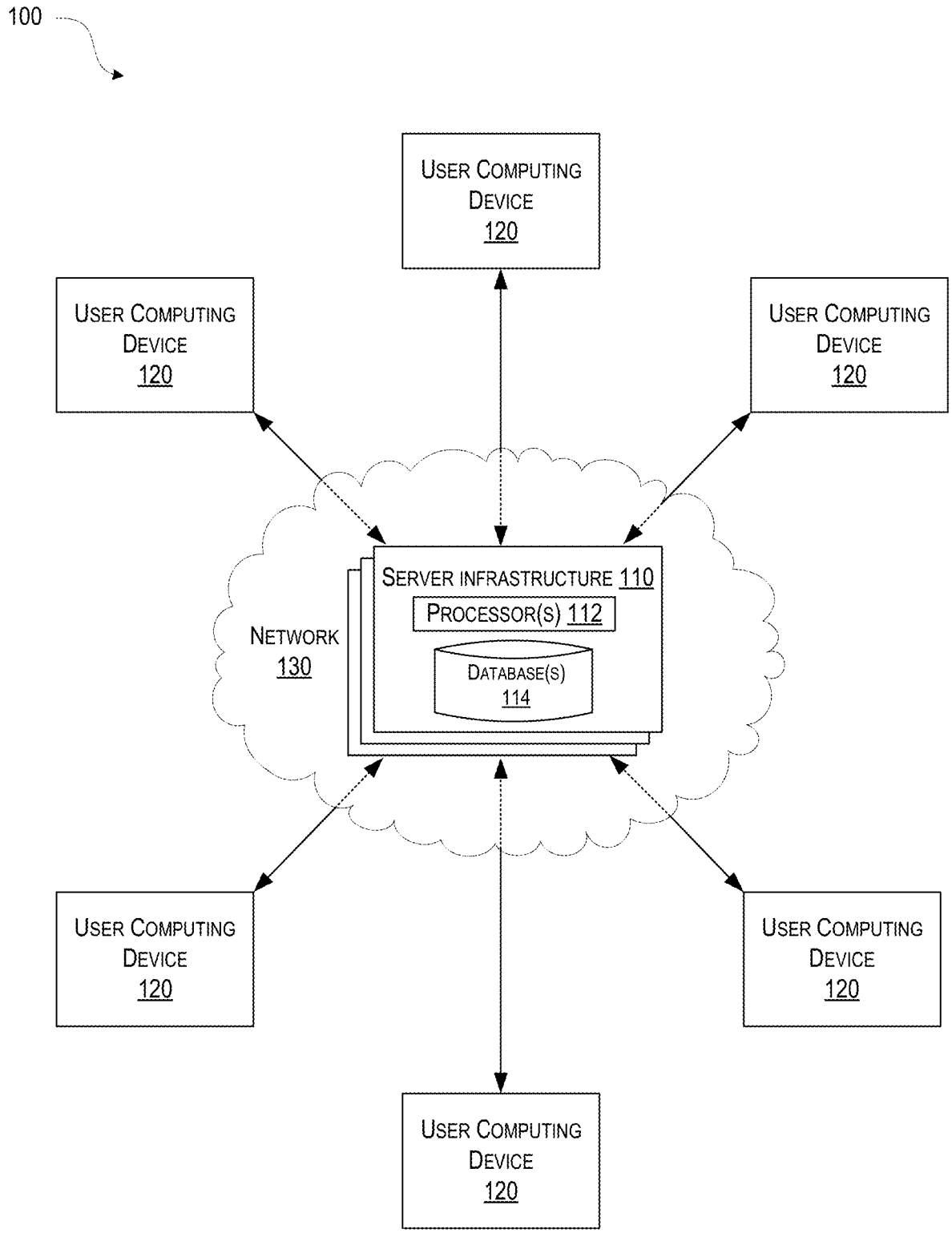
FIG. 1 depicts an illustrative example of centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As a general introduction to the subject matter described in more detail below, aspects described herein are directed towards the methods and systems disclosed herein.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, and/or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network and aggregated through execution of the one or more digital cryptographic hash functions and by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, currency exchange and remittance, P2P transfers, ride sharing, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations." A smart contract operation, as used herein, may describe one or more operations performed by a "smart contract," which may be one or more algorithms and/or programs associated with one or more nodes within a decentralized P2P network. For example, the one or more algorithms and/or programs may correspond to addition of a NFT-API to a blockchain or querying of NFT-APIs stored in a blockchain. Addition of NFT-APIs may correspond to updating those stored in the blockchain.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network. A wallet may be associated with a public key, which may serve to identify the wallet. In requesting performance of network operations, a private key associated with the wallet may be used to digitally sign the network operation requests.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and for interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interlink each of the computing devices comprising server infrastructure 110.

Furthermore, in some embodiments, centralized computer system 100 may include a plurality of computer systems arranged in an operative networked communication arrangement with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
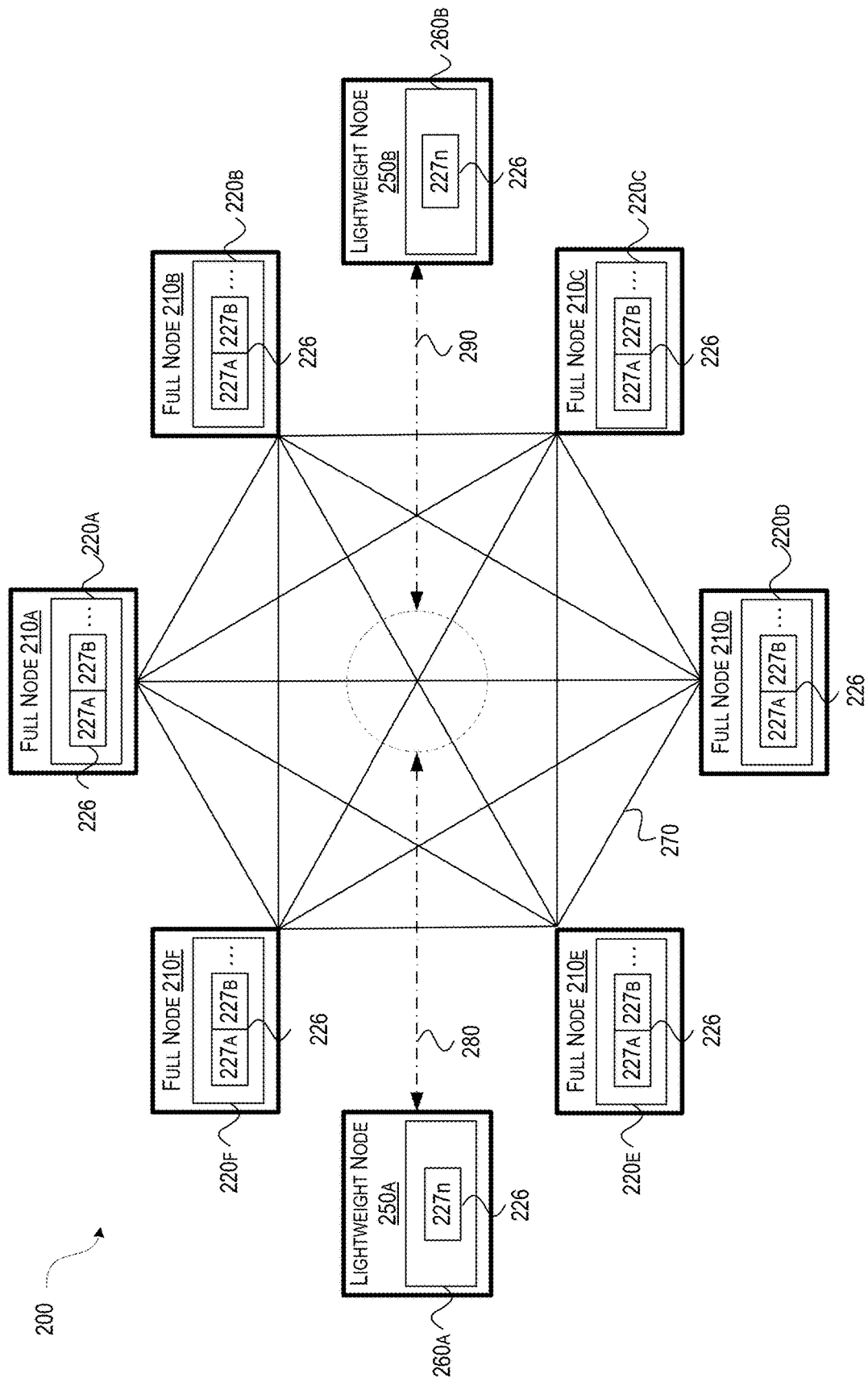
FIG. 2 depicts an illustrative example of decentralized peer-to-peer (P2P) computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and thereby create decentralized P2P network 270. Furthermore, the execution of network protocols by the processors, ASIC devices, and/or GPUs of full node computing devices 210A-210F may cause full node computing devices 210A-210F to execute network functions related to blockchain 226 and maintain decentralized P2P network 270.

Lightweight node computing devices 250A and 250B may request execution of network functions related to decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to decentralized P2P network 270, which may entail a data transfer from a wallet associated with lightweight node computing device 250A to a wallet associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with the wallet of lightweight node computing device 250B. Processors of lightweight node computing device 250A may execute digital signature algorithms to digitally sign balance sheet transaction network function request 280 with the private key associated with the wallet of lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive broadcast of the network function through decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280 may, in turn, be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the wallet of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the wallet of the selected full node computing device to be used as the nonce.

In embodiments in which the consensus algorithm is delegated proof of stake (e.g., DpoS), a group of delegates are chosen from full node computing devices 210A-210F by each of computing devices 210A-210F, wherein full node computing devices 210A-210F are allowed to select delegates based on balance sheet holdings associated with the respective wallets. Full node computing devices 210A-210F, however, may not select themselves to be delegates. Once the group of delegates are chosen, the group of delegates from full node computing devices 210A-210F select a public key associated with a wallet of one of full node computing devices 210A-210F to serve as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key of a wallet associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F corresponding to the nonce to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase balance sheet holdings associated with itself by a predetermined amount. In some arrangements, each of full node computing devices 210A-210F may receive an equal portion of the data transfer amount specified by lightweight node computing device 250A for executing balance sheet transaction network function request 280. After the new block has been added to blockchain 226, balance sheet transaction network function request 280 may be considered to be executed and the data transfer from the wallet associated with lightweight node computing device 250A to the wallet associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function may, in turn, be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to decentralized P2P network 270, which may facilitate a dual data transfer between a wallet associated with lightweight node computing device 250B and a wallet associated with another node in decentralized P2P network 270, such as lightweight node computing device 250A, based on fulfillment of programmatic conditions established by a smart contract. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing the smart contract corresponding to smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with the wallet of lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be timestamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 250B for executing smart contract operation network function request 290. After the new block has been added to blockchain 226, smart contract operation request 290 may be considered to be executed and the data transfer from the wallet associated with lightweight node computing device 250B to the public key associated with the smart contract may be registered.

The smart contract may be configured to hold the data transfer from the wallet associated with lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to smart contract operation request 290 may be one or more algorithms and/or programs stored on a block of blockchain 226. The smart contract may be identified by one or more wallets and/or public keys within decentralized P2P network 270. Lightweight node computing device 250B may transmit smart contract operation network function request 290 to decentralized P2P network 270, which may cause execution of the corresponding smart contract that facilitates a dual data transfer between a wallet associated with lightweight node computing device 250B and a wallet associated with another node in decentralized P2P network 270, such as lightweight node computing device 250A, based on fulfillment of programmatic conditions established by the smart contract. In the processes of adding the block comprising smart contract operation request 290 to blockchain 226, each of full node computing devices 210A-210F may identify the block within blockchain 226 comprising the smart contract, associate the data transfer entailed by smart contract operation request 290 with the smart contract, and execute the one or more algorithms and/or programs of the smart contract. In this instance, given that the smart contract facilitates a dual data transfer and that data transfer has yet to be received from another node (e.g., lightweight node computing device 250A), each of full node computing devices 210A-210F may execute the smart contract without fulfillment of the programmatic conditions established by the smart contract. Accordingly, the funds transferred by lightweight node computing device 250B may remain in the smart contract until the data transfer from the other node is also associated with the smart contract.

Moving forward, lightweight node computing device 250A may also request a smart contract operation related to decentralized P2P network 270, which may conclude the dual data transfer between the wallet associated lightweight node computing device 250A and the wallet associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract corresponding to the smart contract operation network function request. The smart contract operation network function request may further include the public key associated with the smart contract. Processors of lightweight node computing device 250A may execute digital signature algorithms to digitally sign the smart contract operation network function request with the private key associated with the wallet of lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 250A for executing the smart contract operation network function request. After the new block has been added to blockchain 226, the smart contract operation transaction network function request 290 may be considered to be executed and the data transfer from the wallet associated with lightweight node computing device 250A to the public key associated with the smart contract may be registered.

When the smart contract receives the data value from each of lightweight node computing device 250A and lightweight node computing device 250B, the execution of the smart contract by each of full node computing devices 210A-210F may cause transfer of the data value from lightweight node computing device 250A to lightweight node computing device 250B and the data value from lightweight node computing device 250B to lightweight node computing device 250A.

For example, lightweight node computing device 250A may transmit the smart contract operation network function request to decentralized P2P network 270, which may cause execution of the corresponding smart contract that facilitates the dual data transfer. In the process of adding the block comprising the smart contract operation request provided by lightweight node computing device 250A to blockchain 226, each of full node computing devices 210A-210F may identify the block within blockchain 226 comprising the smart contract, associate the data transfer entailed by smart contract operation request of lightweight node computing device 250A with the smart contract, and execute the one or more algorithms and/or programs of the smart contract. In this instance, given that the smart contract facilitates a dual data transfer and that data transfers have been received from lightweight node computing device 250A and lightweight node computing device 250B, each of full node computing devices 210A-210F may execute the smart contract as fulfillment of the programmatic conditions established by the smart contract has occurred. Accordingly, the funds allocated to the smart contract by each of lightweight node computing device 250A and lightweight node computing device 250B may be respectively distributed to the intended counterparty.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, digital content storage and delivery, entity authentication and authorization, digital identity, marketplace creation and operation, internet of things (e.g., IoT), prediction platforms, currency exchange and remittance, P2P transfers, ride sharing, trading platforms, and real estate, precious metal, and work of art registration and transference.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and performance of network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 226 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3B:
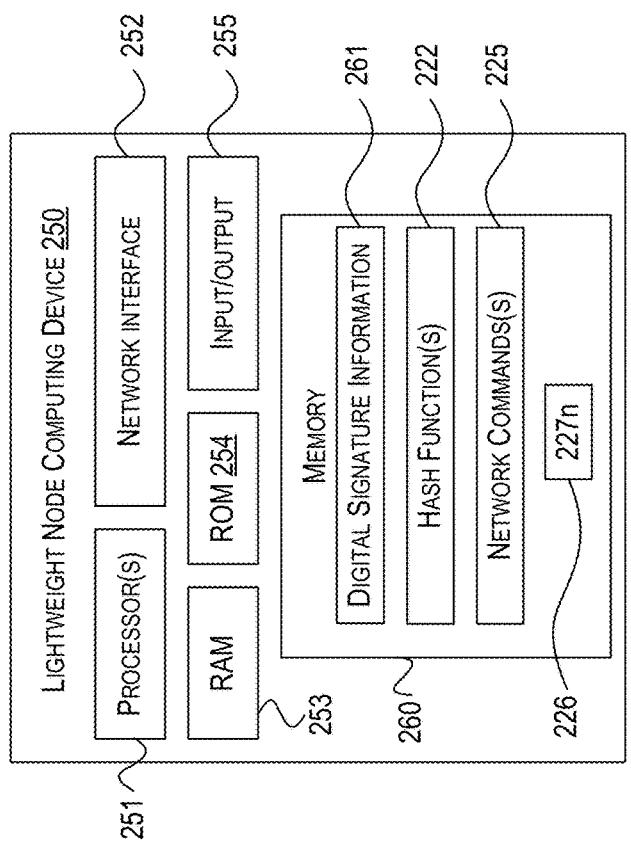
FIG. 3B depicts an illustrative example of a lightweight node computing device that may be used in accordance with one or more illustrative aspects described herein.
Figure 3A:
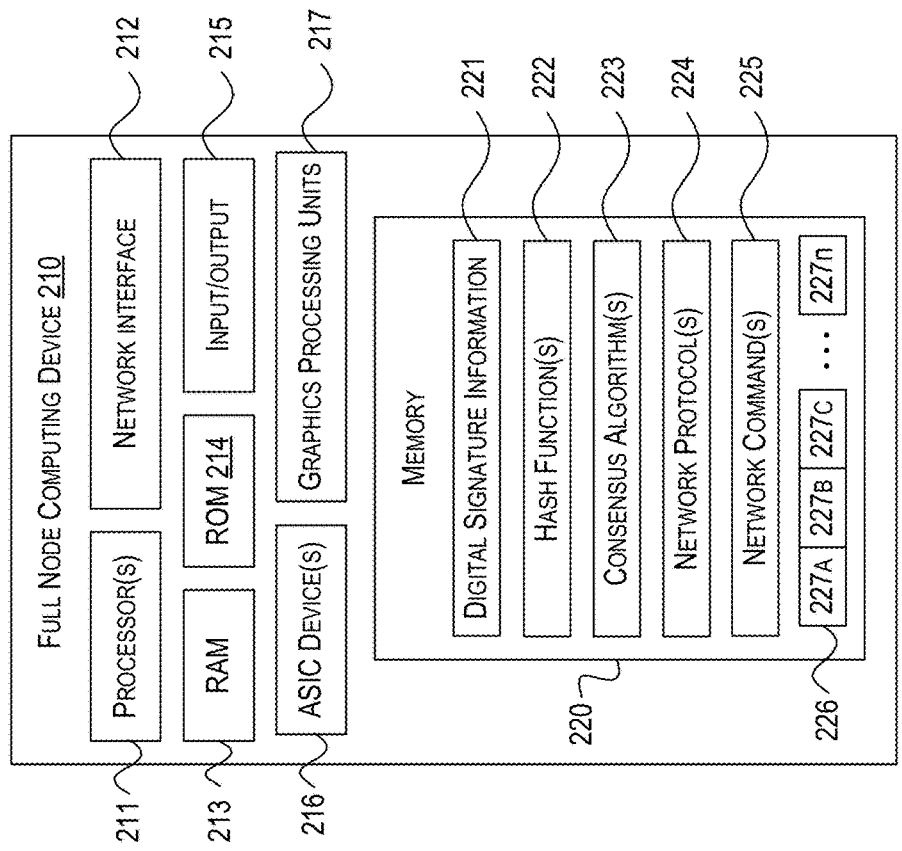
FIG. 3A depicts an illustrative example of a full node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain internodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, and the like), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software, and the like.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, and the like), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Figure 4:
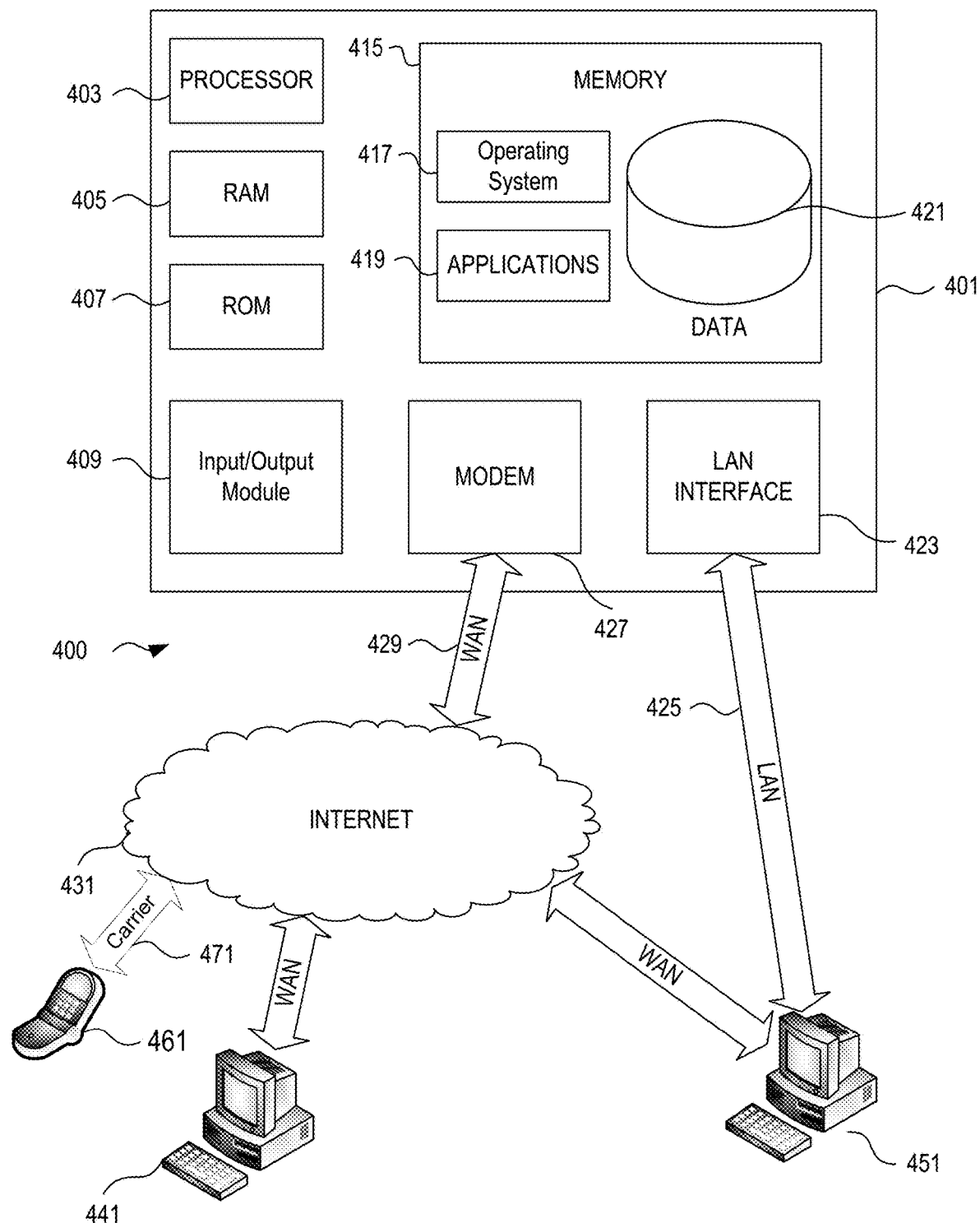
FIG. 4 depicts an illustrative example of a suitable computing system environment that may be used in accordance with one or more illustrative aspects described herein.

FIG. 4 illustrates an example of a computing system environment 400 that may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the computing system environment 400.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, the computing system environment 400 may include a computing device 401 wherein the processes discussed herein may be implemented. The computing device 401 may have a processor 403 for controlling overall operation of the computing device 401 and its associated components, including random-access memory (RAM) 405, read-only memory (ROM) 407, input/output module or communications module 409, and memory 415. Computing device 401 typically includes a variety of computer readable media. Computer readable media may be any available media that may be accessed by computing device 401 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 401.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 400 may also include optical scanners (not shown). Exemplary usages include scanning and converting paper documents, e.g., correspondence, receipts to digital files.

Although not shown, RAM 405 may include one or more applications representing the application data stored in RAM 405, while the computing device is on and corresponding software applications (e.g., software tasks) are running on the computing device 401.

Communications module 409 may include a microphone, keypad, touch screen, and/or stylus through which a user of computing device 401 may provide input, and may also include one or more of a speaker for providing audio output and a video display device for providing textual, audiovisual and/or graphical output.

Software may be stored within memory 415 and/or storage to provide instructions to processor 403 for enabling computing device 401 to perform various functions. For example, memory 415 may store software used by the computing device 401, such as an operating system 417, application programs 419, and an associated database 421. Also, some or all of the computer executable instructions for computing device 401 may be embodied in hardware or firmware.

Computing device 401 may operate in a networked environment supporting connections to one or more remote computing devices, such as computing devices 441, 451, and 461. The computing devices 441, 451, and 461 may be personal computing devices or servers that include many or all of the elements described above relative to the computing device 401. Computing device 461 may be a mobile device communicating over wireless carrier channel 471.

The network connections depicted in FIG. 4 include a local area network (LAN) 425 and a wide area network (WAN) 429, but may also include other networks. When used in a LAN networking environment, computing device 401 may be connected to the LAN 425 through a network interface, such as LAN interface 423, or to an adapter in the communications module 409. When used in a WAN networking environment, the computing device 401 may include a modem in the communications module 409, a modem separate from the communications module 409, such as modem 427, or other means for establishing communications over the WAN 429, such as the Internet 431 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 419 used by the computing device 401, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 401. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 401. Such a processor may execute computer-executable instructions stored on a computer-readable medium. In an example, the systems and apparatus described herein may correspond to the computing device 401. A computer-readable medium (e.g., ROM 407) may store instructions that, when executed by the processor 403, may cause the computing device 401 to perform the functions as described herein.

Figure 5:
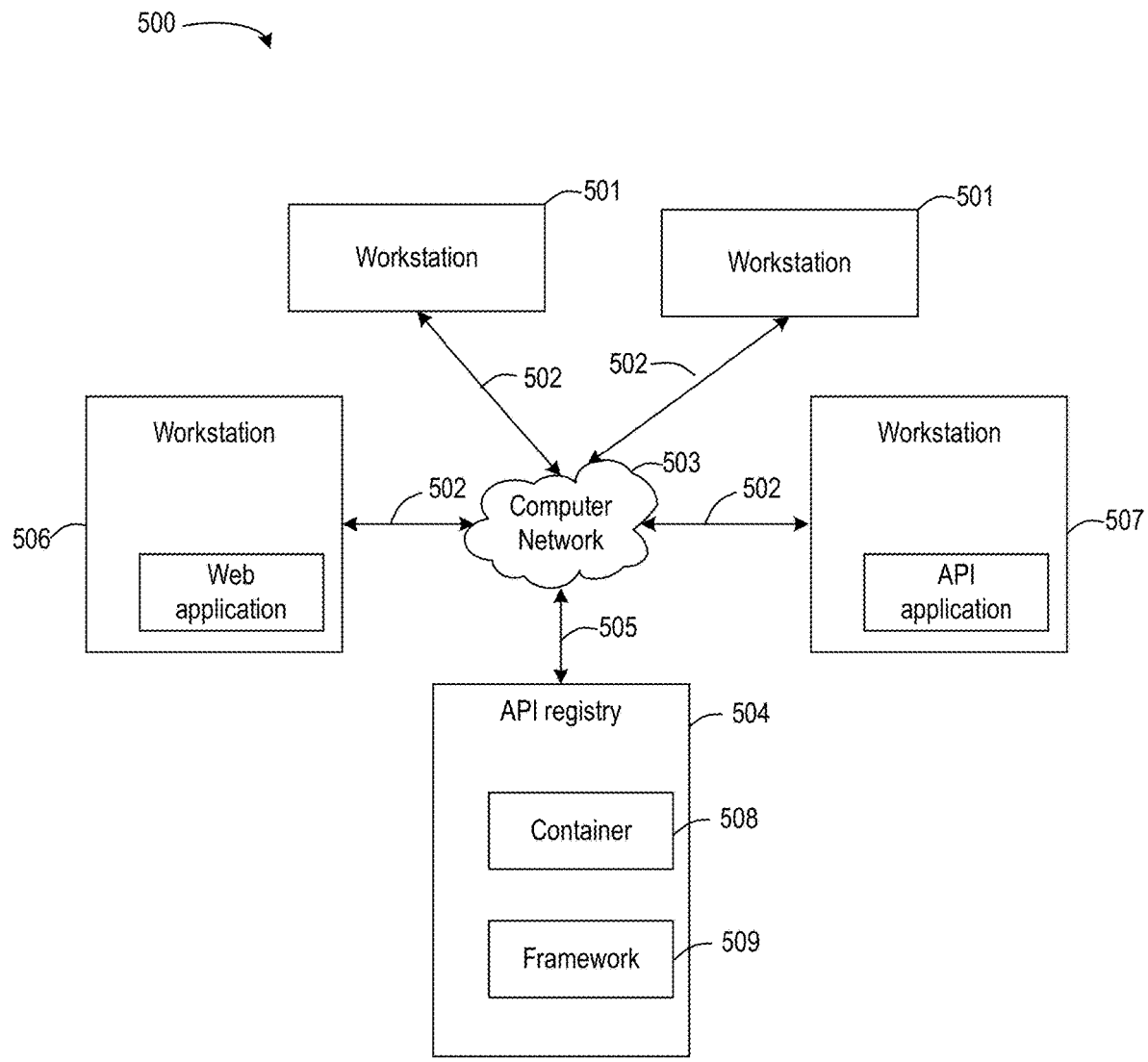
FIG. 5 depicts an illustrative example of a system in accordance with one or more illustrative aspects described herein.

Referring to FIG. 5, an illustrative system 500 for implementing example embodiments according to the present disclosure is shown. As illustrated, system 500 may include one or more workstation computers 501. Workstations 501 may be local or remote, and may be connected by one of communication links 502 to computer network 503. In system 500, an API registry 504 may be installed on any suitable server, server farm, processor, computer, or data processing device, or combination of the same. The API registry 504 may be used to process the instructions received from devOps and the API-related requests entered by users. The API registry 504, in some embodiments, may include one or more modules for creating, controlling, and/or organizing a container 508 and framework 509. For example, the API registry 504 may communicate with a container registry that communicates and orchestrates with a cloud virtualization framework to provide access to one or more API calls/interfaces—such as, provisioning, upgrading, scaling resources on demand through a container orchestration. As a result, a web application in a workstation 506 or an API application in a workstation 507 may communicate, either directly or indirectly, with one or more databases to read, write, or update data through API calls. The API interfaces in the API registry 504 may be bound to NFTs and stored in an API-NFT repository, as illustrated in FIG. 7 and other figures. In addition to serving as a directory of APIs available to devOp users creating a web application on a workstation 506 (or API application on a workstation 507) on network 503, the API registry 504 may also serve as regulator to control access to those same APIs on network 503. In other words, API registry 504 may provide devOps access control for workstations 501, 506, 507 on the network 503.

Computer network 503 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communication links 502 and 505 may be any communication links suitable for communicating, such as network links, dial-up links, wireless links, and hard-wired links.

The steps that follow in the Figures may be implemented by one or more of the components in FIGS. 4 and 5 and/or other components, including other computing devices.

In some aspects, other forms of communications via one or more of communication links can include multi-lateral private message communications. As an example, if a "51%" blockchain problem is anticipated such that a single blockchain user could obtain control of a majority or a near majority of the blockchains in a network in a manner that could render the network vulnerable, one or more of the above communication links can use multi-lateral private messages to communicate sensitive data. Upon a determination that the threat of an attack has been eliminated, the communications can return to using blockchains. Examples of communications and monitoring for preventing such an attack are described below regarding FIG. 6.

By using blockchain nodes/distributed ledgers, information can be communicated in a secure and transparent manner based on blockchain technology described above regarding FIGS. 1, 2, and 3. Blockchain nodes/distributed ledgers have advantages over other forms of communicating data, including, e.g., advantages of immutability, security, traceability, and recovery, described further below.

Immutability refers to something that is unchanging over time, or unable to be changed. In aspects of the disclosure, once data is written to a blockchain, that data cannot be changed—not even by a system administrator or other person having a high level of access. Communicating data via blockchains, as described herein, provides immutability that is particularly advantageous from audit and compliance perspectives relevant to financial transactions. A provider of data that communicates using blockchains as disclosed herein can prove that the data has not been altered. Similarly, a recipient of data communicated via blockchains as disclosed herein can be assured that the data has not been altered.

Security is at a very high level with respect to blockchain based communications disclosed herein. By communicating sensitive information via blockchain nodes/distributed ledgers, as described herein, this information can be transferred and stored in a highly secure manner.

Traceability is another advantage of blockchain based communications disclosed herein. As examples, transaction audit logs and other traceability features of blockchain based communications disclosed herein provide support for preservation of information and transparency of transactions. As an example, if a party wants to determine any changes made to an agreement, or wants to return to a previous agreement or information, the prior data of the blockchain is readily available and traceable to do so.

Data recovery can be an advantageous feature of blockchain based communications disclosed herein. As described herein, a plurality of blockchain nodes can each maintain a copy of blockchain distributed ledgers in a network.

Decentralization, as enabled by a P2P network enables trust in the system as it does not require any third-party to mediate between multiple nodes involved in devOps. API-NFTs stored in a blockchain are hard to revise and tamper. The blockchain may serve as an immutable and trusted ledger that records and validates every operation during devOps development and testing. Use of signatures may ensure that only authorized users (with a valid key) can initiate/update transactions associated with addition/updating of API-NFTs. Further, the inclusion of API-NFTs may provide support for implementing rules and functions. Encryption may be used to restrict access to data stored in blockchain (which is otherwise available to all nodes) to participants who have the privileges.

Figure 6:
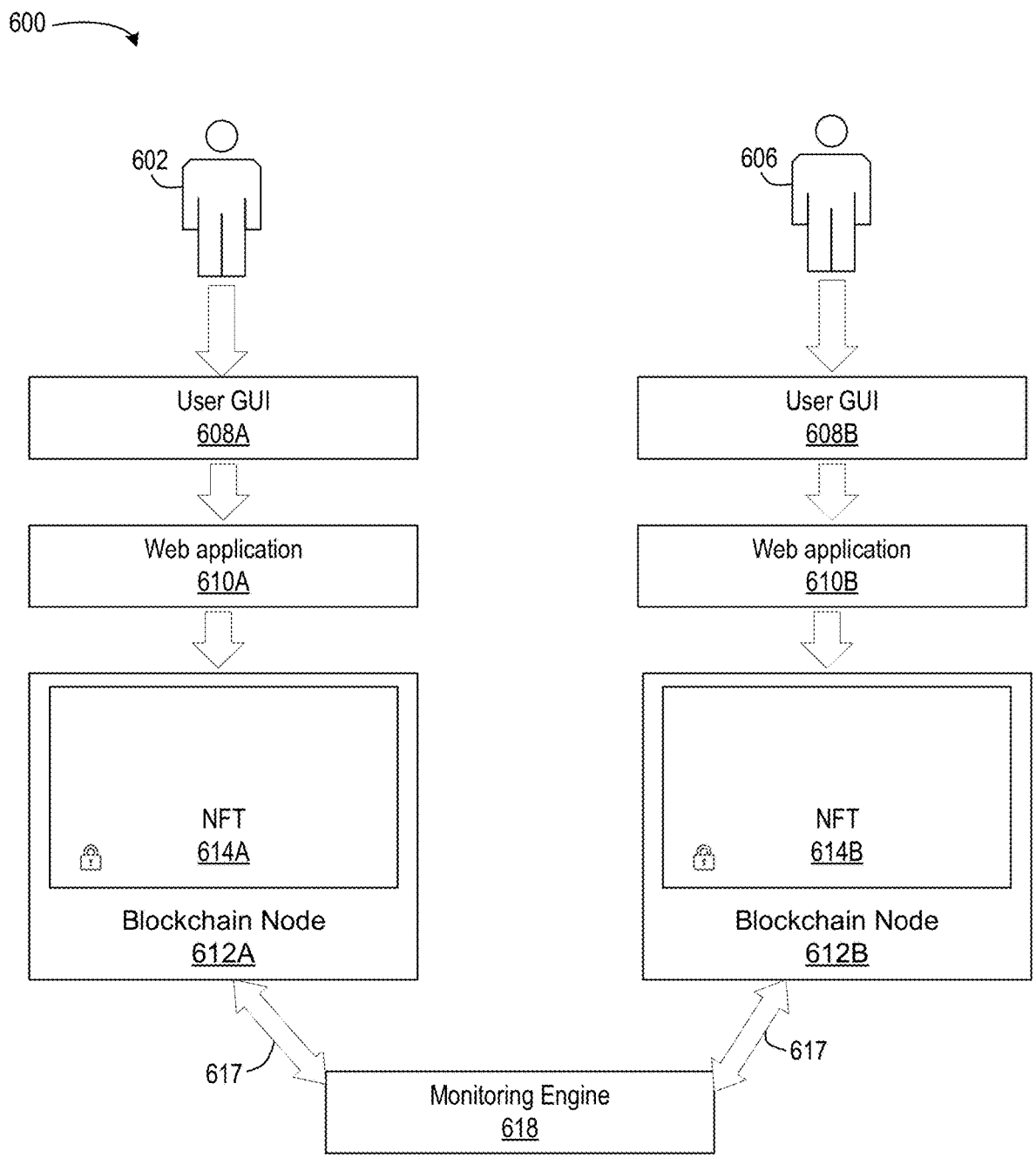
FIG. 6 depicts an illustrative example of a high-level system diagram for a blockchain based system in accordance with one or more illustrative aspects described herein.

FIG. 6 provides additional examples of aspects of the present disclosure relating to blockchain-based NFTs that may be implemented by one or more of the components in FIGS. 2-5 and/or other components, including other computing devices. FIG. 6 depicts a plurality of users 602 and 606 in a system 600 for sharing NFTs 614A and/or 614B among a plurality of blockchain nodes 612A and 612B. While only two blockchain nodes 612A and 612B are shown, system 600 can include any number of blockchain nodes across a network. In some examples, user 602 may correspond to user associated with a first product development (devOps) team or a testing team in FIG. 7, or any other user described herein. User 606 could correspond to another user (e.g., associated with another product devOps team) and may be able to access certain data as input by the user 602. Users 602 and 606 may correspond to users with the same or different access rights to the blockchain. For example, user 602 may input API or modifications of existing APIs for processing by various nodes/users. For example, the API may be associated with a component of a web application being jointly developed and tested by multiple product devOps teams or testing teams in an enterprise organization. User 606 may correspond to a user who may be able to access/validate the API as input by the user 602 in accordance with a NFT involving the blockchain nodes 612A and 612B. For example, the user 606 may review the information input by the user 602 and approve the API for inclusion in an API registry 504 accessible to applications on the network 503. Any number of users may be provided with respective one or more various types of levels of access of data in system 600.

Each user 602 and 606 can communicate in system 600 via respective user graphical user interfaces (GUIs) or other form of interface, such as GUI 606A (e.g., by user 602) and GUI 608B (e.g., by user 606). The GUIs 608A and 608B can operate in connection with one or more applications, such as respective web applications ("web apps") 610A and 610B. Users 602 and 606 can use a web apps 610A and 610B, via a respective User GUI 608A and 608B in a computer device, such as computing device 401 described above, to communicate regarding NFTs 614A and/or 614B stored at a respective blockchain node 612A and/or 612B. User 602 and 606 may use the one or more applications to submit API interfaces to the blockchain and/or approve API interfaces submitted by the other users. In accordance with various examples described herein, the one or more applications may invoke NFTs for execution at other nodes of the P2P network. The NFT may enable the other nodes to access and review submitted API interfaces. The NFT is stored in a blockchain node 612A, which can include, e.g., a blockchain node storing blockchain distributed ledgers described above regarding FIG. 6. In addition, a copy of the NFT 612A can be stored as NFT 614B in blockchain node 612B.

System 600 can optionally include a monitoring engine 618 in communication with blockchain nodes 612A and 612B via communication links 617. Monitoring engine 618 can be located at any location in a network, including, e.g., in a cryptography machine learning enabled blockchain based apparatus described herein or remote therefrom. Monitoring engine 618 can be used to monitor communications between blockchain nodes throughout a network, including, e.g., blockchain nodes 612A and 612B. As examples, monitoring engine 618 can be used to detect and prevent a "51%" attack such as described above. In some embodiments, monitoring engine 618 can determine whether a party has control of within a threshold amount of blockchains, such as 40%, 45%, 46%, 49%, 50%, or 51%. If control of 50% or more of blockchain in a network by one party is detected, one or more communication links such as described above, e.g., regarding FIG. 6, can switch from using blockchains to using multi-lateral private messages for communications of sensitive data. Similar operations can be performed if control of a threshold amount below 50% (e.g., 49%, 46%, 45%, 40%) of blockchains by one party is detected so as to prevent a "51%" attack. As another example, if monitoring engine 618 detects one party, or a number of related parties, obtains or appears to attempt to obtain a threshold amount of blockchains that could lead to a "51%" or similar attack on the blockchain network, additional monitoring can be performed, such as increasing frequency of monitoring activities or adjusting to an increased level of security, e.g., using permissioned blockchains. If at any point in time a "51%" attack is anticipated or detected, any of the blockchain communications described herein can be switched, either permanently or temporarily, to using multi-lateral private messages for communications. If a threat subsides, multi-lateral private messages for communications can return to blockchain communications.

Figure 7A:
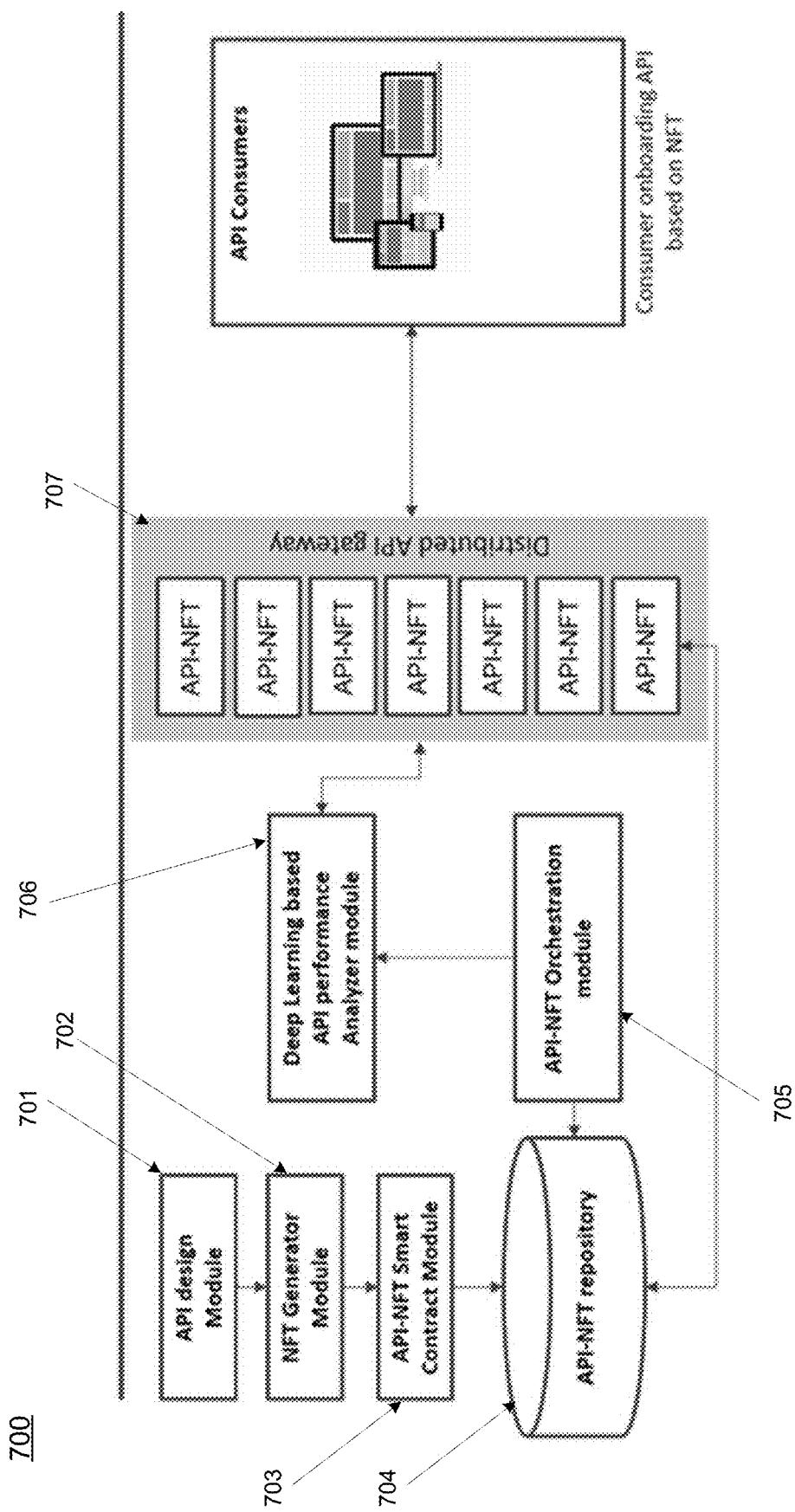
FIG. 7A depicts an example architecture for submission and recordation of API-NFT pairings into a blockchain and validation of the API-NFTs by nodes of a P2P network in accordance with one or more illustrative aspects described herein.

FIG. 7A illustrates components of a system 700 that includes an intelligent apparatus that leverages NFTs to validate application programming interfaces (APIs) and enables consumers to onboard an API in a secure manner. An API design module 701 may, inter alia, search for APIs (e.g., internal APIs for an enterprise organization) on a network. The disclosed method ensures ownership of developed API and prohibits malicious actor from tampering with the API. One or more engine searches one or more API repositories and catalogs the API interfaces, method calls, and other attributes for binding to an NFT that is added to an Ethereum blockchain. The NFT is on the blockchain and tied to the API.

Moreover, API providers and consumers are managed based on smart contract linked to specific API. API service provider during API development can convert API and associated meta data into a non fungible token (NFT) which is managed by the smart contract, which defines one or more rules associated with the API and consumer onboarding. While NFTs are often used for ownership purposes, the system 700 uses NFTs for non-conventional purposes. A non-fungible token is a unit of data stored on a digital ledger, called a blockchain, that certifies a digital asset to be unique and therefore not interchangeable. NFTs are created when blockchains string records of cryptographic hash, a set of characters identifying a set of data, onto previous records therefore creating a chain of identifiable data blocks. This cryptographic transaction process ensures the authentication of each digital file by providing a digital signature that is used to track NFT ownership.

A NFT generator module 702 may be a central authorizing entity that generates the aforementioned NFT. The NFT generator module 702 automatically mines, inter alia, the API metadata to create the NFT. A devOps user may access an API registry 504 to lookup available APIs on a network 503, and then request access through an API-NFT smart contract module 703. Through an API-NFT smart contract module 703, consumers can onboard specific NFT linked API and consume API services in a secure manner.

API-NFT repository 704 stores the API-NFT pairings in a memory storage unit. The API-NFT pairings may include API metadata that defines the technical function and operation of the API including but not limited to, it's API name, service protocol, architectural design format of the API (such as SOAP, REST, EVENT, or the like), API development standard to which the API specification conforms (such as OAG, OSA2, OSA3, OSA4, NA, or the like), whether the API handles transactions involving nonpublic personal information (NPI), file definition format of the API specification (such as JSON, XML, or the like), API operations that this API specification supports (such as CREATE, READ, UPDATE, DELETE, or the like), and authentication type (such as OAuth, SAML, MTLS, SiteMinder, Basic, RACF, Secret Key Exchange, Kerberos, or the like). Additional metadata or configuration parameters include but are not limited to: whether proxy API has been configured for this API for policy retrieval (i.e., Yes or No); type of API gateway 707 in which policies for this API are deployed; the data transfer protocol(s) being used for data traffic between a client application and an application server hosting the API (e.g., HTTP, HTTPS, or other); data vintage setting indicating a time period or age of the data records/snapshots that are handled by the API; whether certain API are enabled/disabled for API consumer usage based on dynamically updated measurements; and the like.

In the illustrative system 700 of FIG. 7A, API-NFT orchestration module 705 may act as an interface/intermediary between the API-NFT repository 704 and API-NFT distributed API gateway 707. In some embodiments, the deep learning based API performance analyzer module 706 may interact with the API-NFT orchestration module 705 to receive information about various API performance measures. For example, in one example, the system 700 configuration may indicate that during service phase API performance is measured on real-time and act as feed to API-NFT repository 704 (e.g., primary repository). This repository may be dynamically updated by API-NFT orchestration module 705 making certain API enable/disable for consumer usage. The distributed API gateway 707 provides an interface for one or more API consumers, such as devOps users, to onboard and access APIs based on NFTs.

Figure 7B:
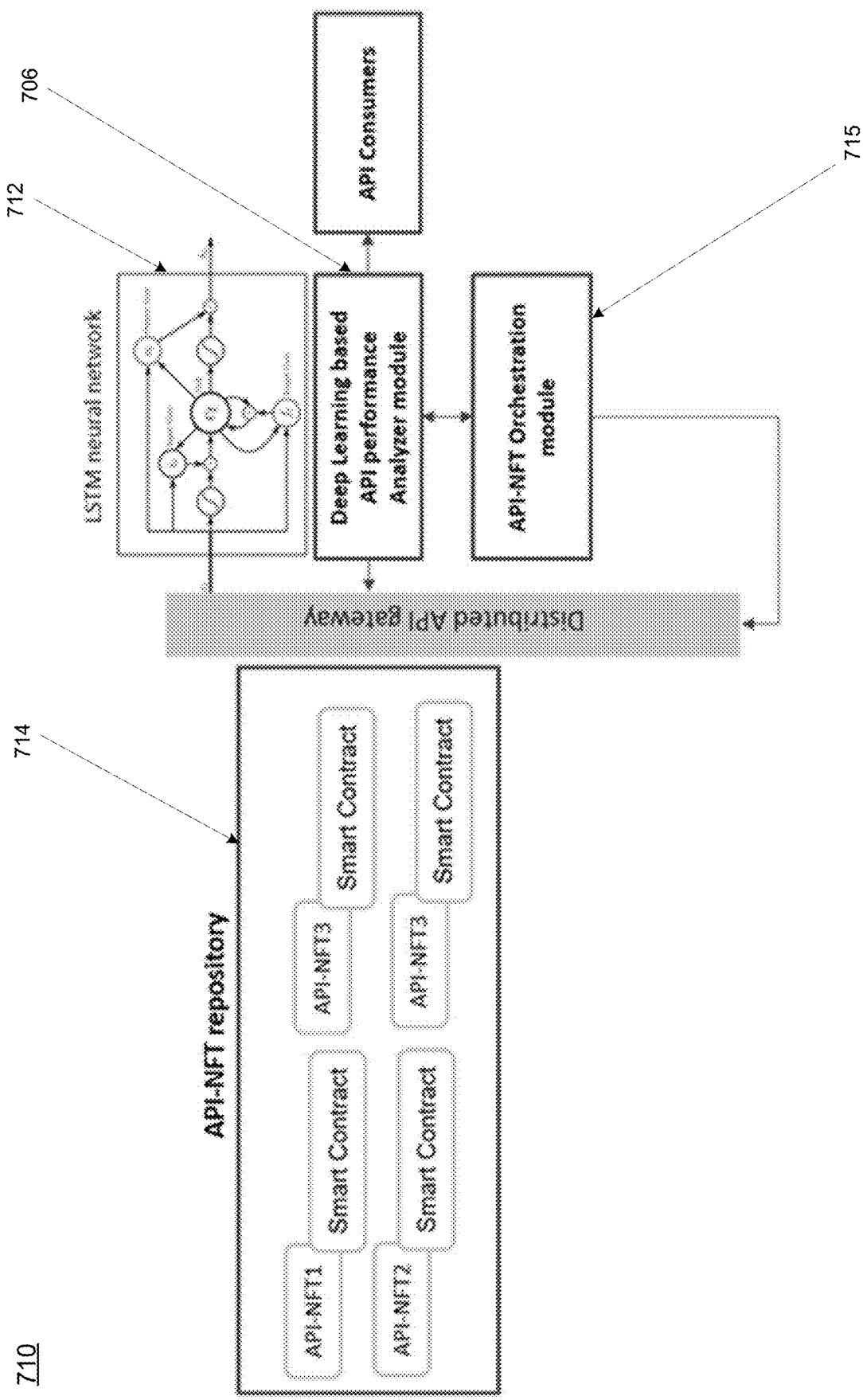
FIG. 7B depicts an example architecture for artificial intelligence (AI)-based generation and dynamic modification in accordance with one or more illustrative aspects described herein.

FIG. 7B illustrates components of a system 700 that includes an intelligent apparatus that binds/couples each NFT-API to a performance monitoring engine that measures and analyzes performance metrics (e.g., request per min., average and max latency, errors per min., API uptime, time to first hello world, memory/CPU usage, and/or the like) using artificial intelligence and/or machine learning (AI/ML) and then activate/deactivate consumer access to the API by the NFT orchestration system accordingly.

For example, in FIG. 7B, the API-NFT orchestration module 715 manages the API-NFT and smart contracts stored in an API-NFT repository 714 to create one or more rules to regulate the access and control of the API. The API-NFT orchestration module 715 may be arranged to more closely tie smart contracts to the API-NFT bindings such that API-NFT-to-SmartContract couplings are stored in an API-NFT repository 714. For example, smart contract may be used to implement rules to register consumer, authorize consumer, onboarding policy, firewall rules, and/or proxy rules. The smart contract may also indicate whether performance tracking (Yes/No) is enabled at a given time, and control consumer onboarding to API based on smart contract (pairing/coupling of API-NFT to smart contract). For example, each API-NFT is bound to API performance analyzer module 706 which extracts performance metrics while consumer onboard API and using API on real-time. Performance feed is used by the API-NFT orchestration module 715 to enable/disable APIs stored in a repository 714.

The performance output may trigger the API to be deactivated when certain threshold measurements have been exceeded. API Performance measurements include but are not limited to request Per minute (RPM), average and max latency, errors per minute, API uptime, time to first "Hello World," and memory and CPU usage). In addition, the system disclosed herein may include an intelligent AI-ML mechanism to manage NFT-linked API repository based on real-time performance feed while API are consumed by consumer. An example of an intelligent AI-ML mechanism is a long short term memory (LSTM) neural network 712. The LSTM neural network analyzes the inputs from the system 710 and generates the instructions/commands that a DL based API performance analyzer module 706 may use to control API-NFT orchestration module 715.

In some embodiments, one or more method steps are performed for monetizing API provider services based on consumer traffic and ensuring reliability of API services.

Figure 8A:
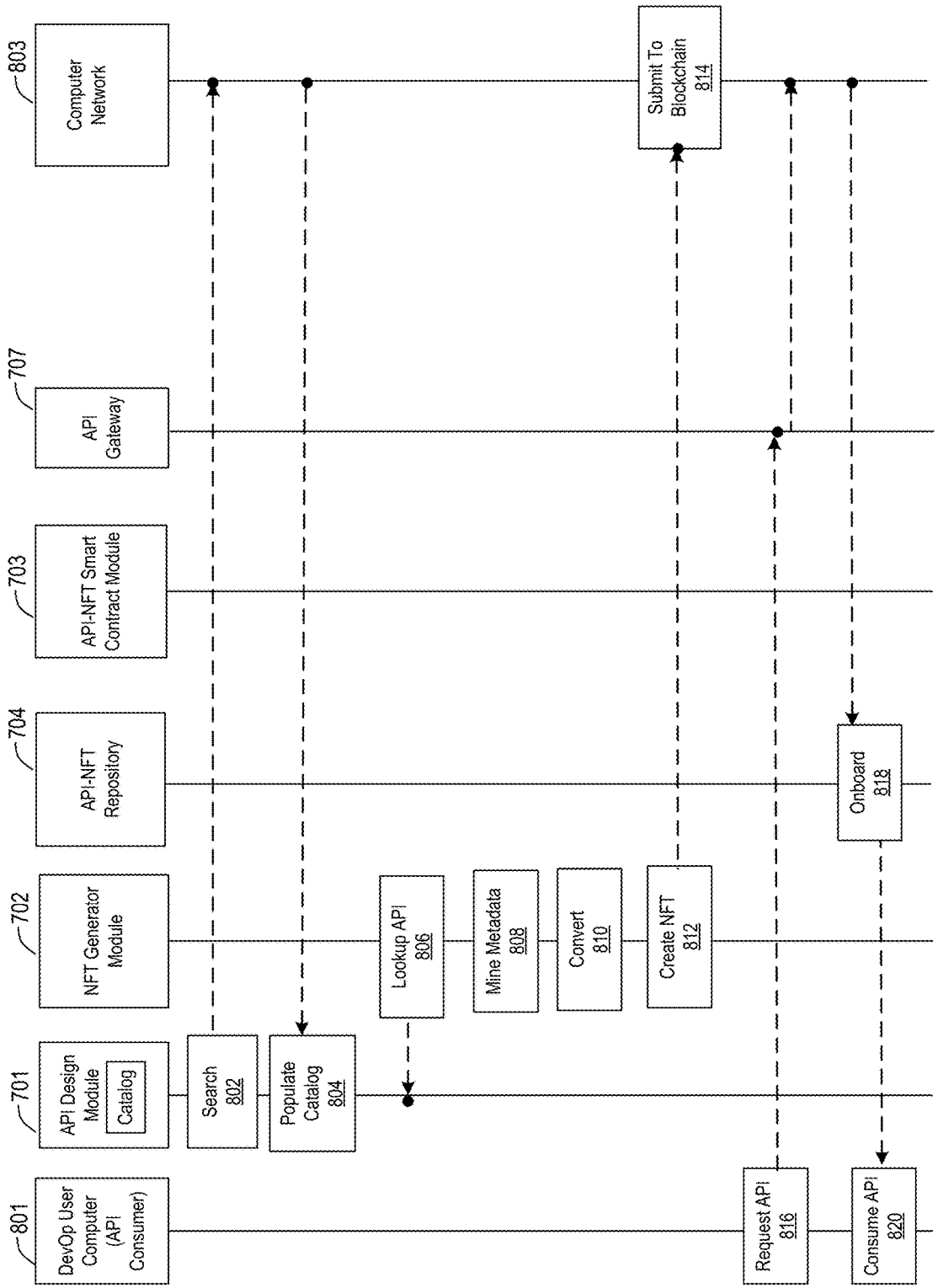
FIG. 8A, FIG. 8B, and FIG. 8C (collectively referenced as "FIG. 8") depict an example event sequence for API submission, API-NFT binding, and/or performance monitoring in accordance with one or more illustrative aspects described herein.

FIG. 8A illustrates components of a system directed to a novel use of nonfungible tokens (NFTs) that involves methods and systems that automatically search for and generate non-fungible tokens (NFTs) for application programmer interfaces (APIs)/intermediate layers on a computer network using at least two inputs: (i) associated metadata of an API, and (ii) a hash of the API/intermediate layer. The system generates NFTs corresponding to APIs desired to be accessed by a devOp user computer 801 (e.g., an API consumer). Components of the system include an API design module 701 and a NFT generator module 702.

In some embodiments, the system automatically searches 802 for API/intermediate layers on a network 803 using an API registry 504 or catalog. In one example, an API design module 701 may, inter alia, search 802 the computer network 803 for APIs (e.g., internal APIs for an enterprise organization) on a network. The catalog or registry may provide an API directory of API interfaces available to devOps (e.g., devOp user computer 801) communicatively coupled to the network 803. The API design module 701 may populate 804 a repository with a catalog of API interfaces and method calls.

Once API/intermediate layers are identified, whether on a network 803 or through a different channel, the system generates a NFT to certify the authenticity of the asset. In one example, a NFT generator module 702 may lookup 806 an available API on the network 803 by accessing the catalog in a repository. The repository storing the catalog/registry may be at the API design module 701 as illustrated in FIG. 8A, or may be located elsewhere in the system 500.

Next, the NFT generator module 702 may mine 808 metadata associated with an available API. The associated metadata of the available API may be associated with the NFT. The associated metadata, in one example, may define technical function and operation of the available API. For example, the associated metadata may comprise API name, service protocol, and/or architectural design format of the available API. Examples of an architectural design format are SOAP, REST, and/or EVENT.

In some embodiments, converting an API and its associated metadata into a NFT, which is managed by a smart contract, may be a multi-step process. For example, the NFT generator module 702 may convert 810 the available API and the associated metadata into a sequence of characters. In some examples, the sequence of characters may a hash value generated by the NFT generator module 702 to authenticate the specific, available API. This form of an unique, cryptographic hash is used to authenticate and certify a digital asset, such as an API or the like.

Then based on the unique sequence of characters, the NFT generator module 702 creates 812 a NFT and submits 814 the NFT to a blockchain network. The blockchain network, as is typically done, will process and validate the NFT before adding it to the blockchain. The blockchain may be a digital distributed ledger, and the NFT may be an identifiable data block stored on the blockchain to certify that the available API is authentic. The digital signature or comparable hash is stored in a repository used to track ownership of the available API corresponding to the NFT and authenticate the NFT.

With the NFT having been added to the blockchain, when a devOp user computer 801 later requests 816 access to the API for consumption 820, the system accesses the NFT associated with the available API to first certify its authenticity. In one example, the devOp user computer certifies authenticity of the available API with a cryptographic hash; and after the certifying, enables the devOp user computer to consume 820 the available API in the catalog of API interfaces and method calls. In an alternate example, the API-NFT repository 704 performs the aforementioned steps of certifying authenticity of the available API with a cryptographic hash and after the certifying, enabling the devOp user computer to consume 820 the available API.

In some examples, the creation of the NFT is for the specific, narrow purpose of binding an API (e.g., a set of defined rules for inter-communication between computers or applications; or an intermediary layer that processes data between an application and web server). The metadata of the API is associated with the API-NFT pair binding. The API-NFT pair binding is a mechanism to ensure that developers/consumers are ingesting/using APIs that are secure and do not include malicious rules. In some examples, if an API interface and/or method calls are discovered to be associated with a known malicious actor (e.g., a system disseminating malware, virus, or the like), the API design module 701 may update the catalog by removing those potentially nefarious API interfaces and method calls. Alternatively, the system may include a distributed API gateway 707 that provides an interface through which the devOp user computer 801 accesses the available API. Therefore, the distributed API gateway 707 intelligently leverages NFTs to validate application programming interfaces (APIs) and enables API consumers to onboard an API in a secure manner. However, it ensures ownership of developed API and prohibits malicious actor from tampering with the API. A NFT based mechanism validates ownership of developed API and its service to, inter alia, ensure tamper proof API for distributed development and production environments for applications.

Figure 8B:
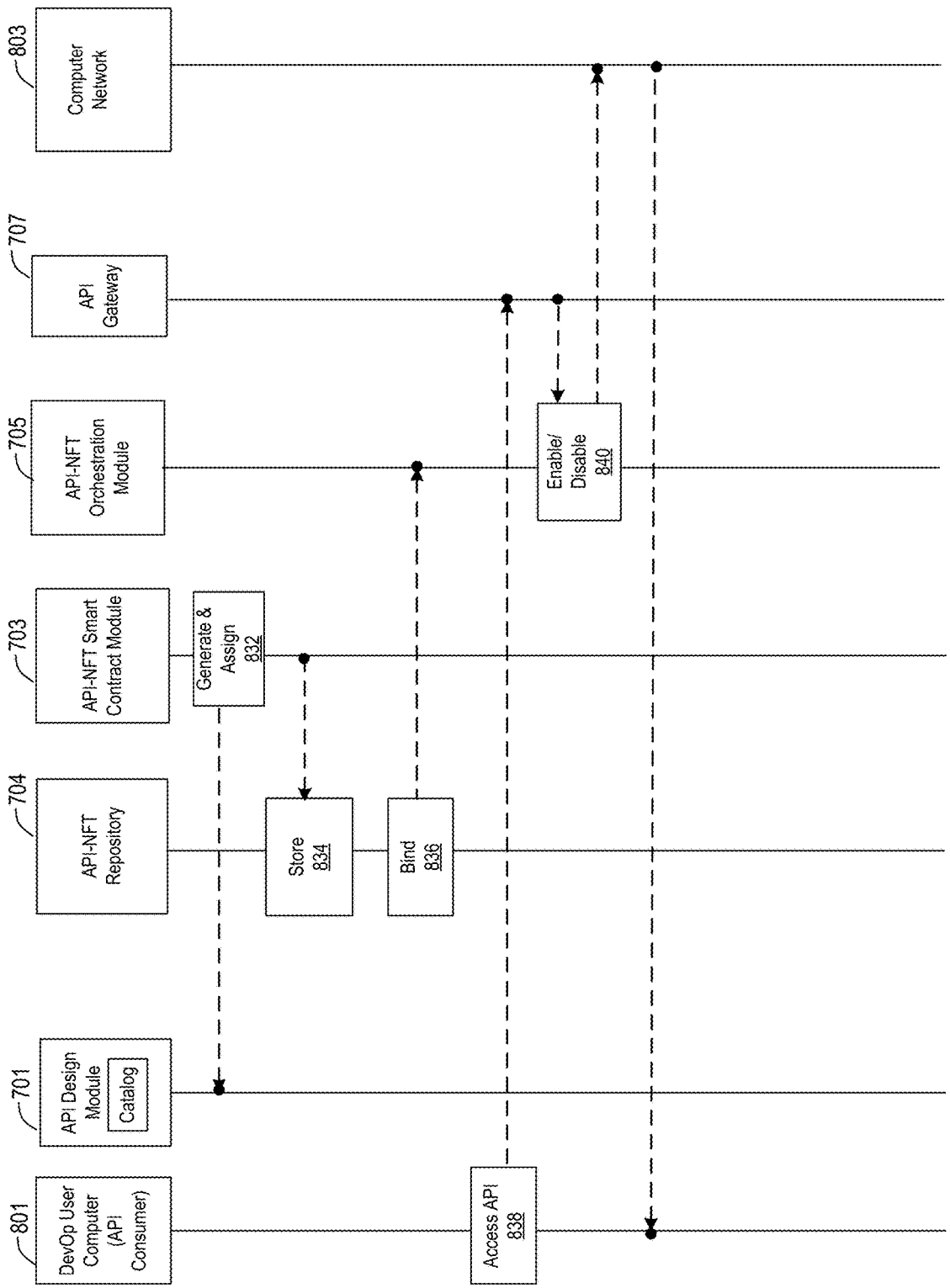

FIG. 8B illustrates components of a system directed to constructing a smart contract that regulates access to application programmer interface (API) services by a devOp user computer 801 through API-NFT (nonfungible token) bindings stored in an API-NFT repository 714. Components of the system include an API-NFT smart contract module 703, an API-NFT repository 704, and an API-NFT orchestration module 705.

The API-NFT smart contract module 703 is configured to generate and assign 832 a smart contract. The API-NFT smart contract module 703 generates a smart contract for an API based on the NFT associated with the API/API services. The API services include API interfaces and method calls. The API-NFT smart contract module 703 also assigns one or more rules to the smart contract, including rules related to registering the devOp user computer, accessing API services, and/or onboarding policy firewall rules. In one example, a rule of the smart contract related to the devOp user computer causes the API-NFT orchestration module 705 to disable access by a devOp user computer 801 to the API services based on a restricted authorization level of the particular devOp user logged into the devOp user computer 801. In another example, if a properly-authorized devOp user is logged into the devOp user computer 801, then the API-NFT orchestration module 705 enables access to the API services.

In some examples, the smart contract may include a myriad of rules including tracking monetization based on API consumption, managing API consumption in a secure manner, and/or establishing rules for parties to the smart contract. For example, when tracking monetization based on API consumption, the API gateway 707 may include an incremental counter to tally the number of times each of API interfaces and/or method calls are requested by a particular devOp user and/or devOp user computer 801. The tally/count may correlate with a monetary expense/charge associated with API service consumption.

The API-NFT repository 704 is configured to store 834 the smart contract generated by the API-NFT smart contract module 703. The repository is computer memory on premises, in a cloud environment, or hybrid environment. The API-NFT repository 704 also binds 836 the API-NFT with the smart contract to authenticate and/or regulate access to the API services. The API-NFT repository 704 (e.g., primary repository) may be dynamically updated by the API-NFT orchestration module 705.

In one example, a catalog of API interfaces and method calls (e.g., API registry 504) may be used to process the instructions received from devOps and the API-related requests entered by users. Such a catalog may include one or more modules for creating, controlling, and/or organizing a container 508 and framework 509. For example, such a catalog may communicate with a container registry that communicates and orchestrates with a cloud virtualization framework to provide access to one or more API calls/interfaces. The API interfaces in the catalog may be bound to NFTs and stored in an API-NFT repository 704.

The API-NFT orchestration module 705 acts as an interface/intermediary between the API-NFT repository 704 and API-NFT distributed API gateway 707. The API-NFT orchestration module 705 is configured to enable or disable 840 access by the devOp user computer 801 to the API services associated with the smart contract based on rules assigned to the smart contract relating to regulating access through the distributed API gateway 707. The devOp user computer 801 may attempt to access 838 an API service, but the system may pass API service requests through an API gateway 707 that filters the API interface and/or method calls. In some examples, the API-NFT repository 704 stores a plurality of smart contracts such that each of the smart contracts corresponds to the same or different API services published on a public network, such as computer network 803. The API-NFT orchestration module 705 regulates access to these API services by enabling or disabling access by devOp user computers 801 to one or more of these API services.

In some examples, an API-NFT orchestration module 705 may be arranged to tie smart contracts to the API-NFT bindings such that the API-NFT orchestration module 705 manages the API-NFT and smart contracts stored in an API-NFT repository 704 to create one or more rules to authenticate and/or regulate the access and control of the API. For example, smart contract may be used to implement rules to register a consumer (e.g., devOp user computer 801), authorize the consumer, onboard policy firewall rules, and/or proxy rules.

The API gateway 707 provides an interface for devOp user computers 801 to onboard and/or access APIs based on NFTs.

In an alternate example, in addition to serving as a catalog of APIs available to devOp user computer developing a web application on network 803, the API catalog may also serve as regulator to control access to those same APIs on network 803. In other words, the API catalog may provide devOp access control for workstations 501, 506, 507 on a network 803.

Figure 8C:
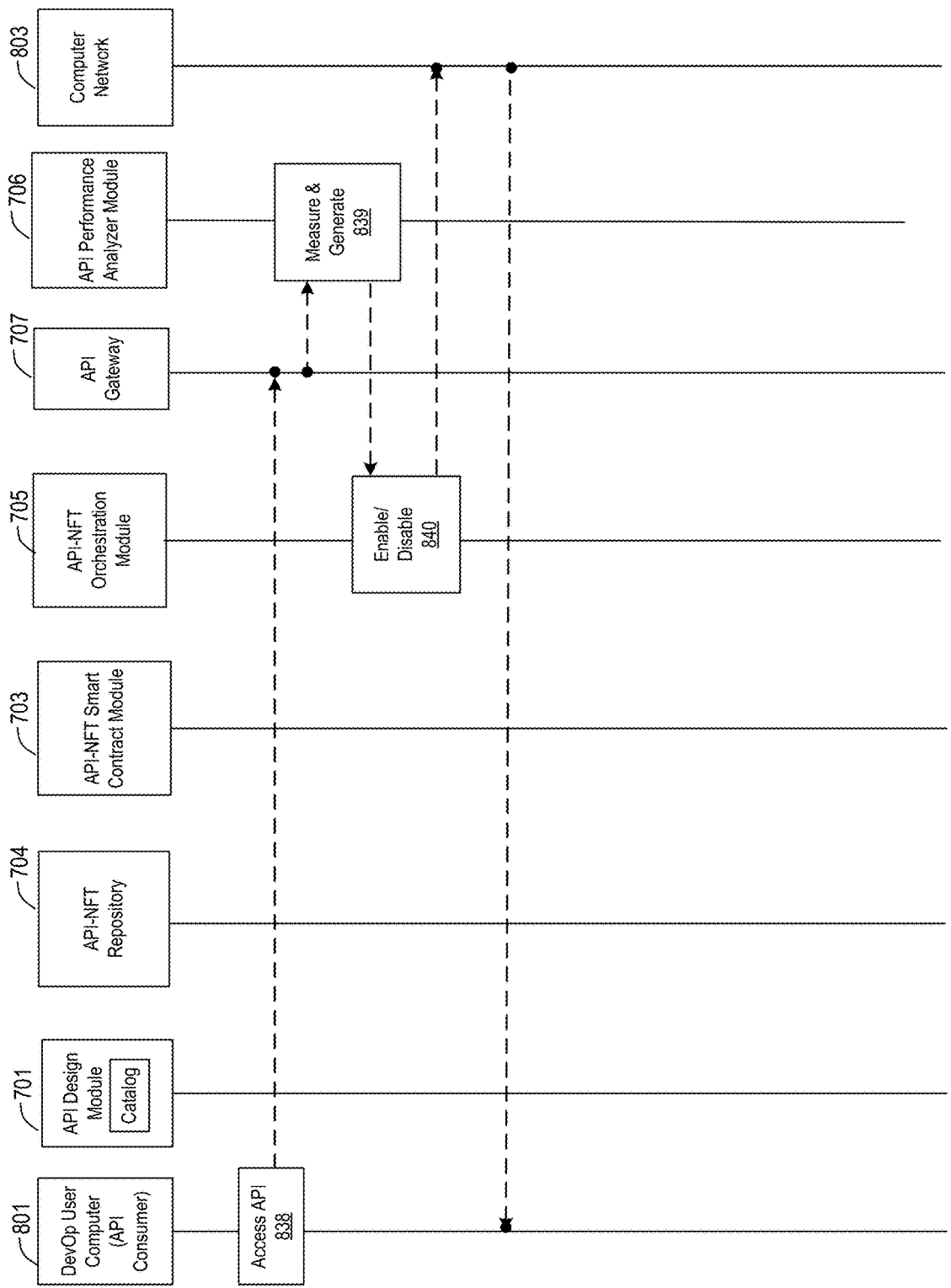

FIG. 8C illustrates an embodiment directed to an API-NFT orchestration module that binds/couples each NFT-API binding to a performance monitoring engine (e.g., an API performance analyzer module 706) that measures and analyzes performance metrics using artificial intelligence and/or machine learning (AUML). In one embodiment, a system is illustrated including a performance monitoring engine that uses machine learning (ML) to activate or deactivate access by a devOp user computer 801 to an API service.

The API performance analyzer module 706 (e.g., performance monitoring engine) is configured to measure 839 a plurality of performance metrics of the API service. The plurality of performance metrics measured by the API performance analyzer module 706 may include but is not limited to: request per minute (RPM), average and max latency, errors per minute, and API uptime. Other examples of performance metrics include but are not limited to time to first hello world, memory/CPU usage, and/or the like.

In some examples, the analysis is performed using machine learning (ML). For example, sometimes the analysis of the performance metrics uses a long short term memory (LSTM) neural network 712. And it generates 839 one or more commands based on the LSTM neural network output. The performance output may trigger the API to be deactivated when certain threshold measurements have been exceeded.

Then API performance analyzer module 706 activates/deactivates 840 access to the API using the API-NFT orchestration module 705. In addition, the system disclosed herein may include an intelligent AI-ML mechanism to manage NFT-linked API repository based on real-time performance feed while API are consumed by consumer. In some embodiments, one or more method steps are performed for monetizing API provider services based on consumer traffic and ensuring reliability of API services. For example, the NFT orchestration system manages smart contracts to create one or more rules to regulate the access and control of the API.

The API-NFT orchestration module 705 is configured to receive the one or more commands from the API performance analyzer module 706. Based on the one or more commands, it may enable or disable 840 access by the devOp user computer 801 to the API service associated with a smart contract regulating access through an API gateway 707. When the command generated 839 by the API performance analyzer module 706 is an enable command because the LSTM neural network output indicates the API service is performing within a predetermined range (e.g., within a threshold range of requests per minutes, for example), and wherein the enable command causes the API-NFT orchestration module 705 to enable access by the devOp user computer to the API service.

Alternately, the command generated 839 by the API performance analyzer module 706 may be a disable command when the LSTM neural network output indicates the API service is performing outside of a predetermined range, and wherein the disable command causes the API-NFT orchestration module 705 to disable access by the devOp user computer 801 to the API service.

In some embodiments, the deep learning based API performance analyzer module 706 may interact with the API-NFT orchestration module 705 to receive information about various API performance measures. For example, in one example, the system configuration may indicate that during service phase, API performance is measured on real-time and act as feed to API-NFT repository 704 (e.g., primary repository). This repository may be dynamically updated by API-NFT orchestration module 705 making certain API enable/disable for devOp usage.

The API gateway 707 provides an interface for one or more API consumers, such as devOps users, to onboard and access APIs based on NFTs.

The API-NFT orchestration module 705 manages the API-NFT and smart contracts stored in an API-NFT repository 704 to create one or more rules to regulate the access and control of the API. For example, smart contract may be used to implement rules to register consumer, authorize consumer, onboarding policy, firewall rules, proxy rules, whether performance tracking (Yes/No) is enabled at a given time, and/or control consumer onboarding to API based on smart contract (pairing/coupling of API-NFT to smart contract). For example, each API-NFT is bound to API performance analyzer module 706 which extracts performance metrics while consumer onboard API and using API on real-time. Performance feed is used by the API-NFT orchestration module 705 to enable/disable APIs stored in a repository 704.

The performance output may trigger the API to be deactivated when certain threshold measurements have been exceeded. API performance measurements include but are not limited to request per minute (RPM), average and max latency, errors per minute, API uptime, time to first "Hello World," and memory and CPU usage. An example of an intelligent AI-ML mechanism is a long short term memory (LSTM) neural network 712. The LSTM neural network analyzes the inputs from the system 710 and generates the instructions/commands that a DL based API performance analyzer module 706 may use to control API-NFT orchestration module 715. In some embodiments, one or more method steps are performed for monetizing API provider services based on consumer traffic and ensuring reliability of API services.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system for generating nonfungible tokens (NFTs) corresponding to application programmer interfaces (APIs) accessed by a devOp user computer, the system comprising:
   an API design module configured to:
      search a computer network for APIs; and
      populate a repository with a catalog of API interfaces and method calls;
   a NFT generator module configured to:
      lookup an available API on the computer network by accessing the catalog in the repository;
      mine metadata associated with the available API;
      convert the available API and the associated metadata into a sequence of characters;
      create a NFT based on the sequence of characters, wherein the sequence of characters is unique; and
      submit the NFT to a blockchain network for addition of the NFT to a blockchain; and
   a computer memory storing computer-executable instructions that, when executed by the devOp user computer, cause the system to:
      request access to the available API by accessing the NFT associated with the available API;
      onboard the available API using the NFT; and
      consume, by the devOp user computer, the available API in a secure manner.

2. The system of claim 1, wherein the NFT certifies a digital asset to be unique and authentic using a cryptographic hash, and wherein the digital asset comprises the available API, and wherein the blockchain is a digital distributed ledger, and wherein the NFT is an identifiable data block stored on the blockchain to certify that the available API is authentic.

3. The system of claim 2, wherein the repository stores a digital signature used to track ownership of the available API corresponding to the NFT and authenticate the NFT.

4. The system of claim 1, wherein the API design module is configured to update the catalog by removing those API interfaces and method calls that are associated with a known malicious actor.

5. The system of claim 1, wherein the NFT generator module is configured to generate a hash used to authenticate the available API.

6. The system of claim 1, wherein the NFT associated with the available API includes the associated metadata of the available API.

7. The system of claim 6, wherein the associated metadata defines technical function and operation of the available API.

8. The system of claim 7, wherein the associated metadata comprises API name, service protocol, and architectural design format of the available API.

9. The system of claim 8, wherein the architectural design format of the available API is one of SOAP, REST, and EVENT.

10. The system of claim 1, wherein the onboarding of the available API using the NFT comprises, by an API-NFT repository:
   certifying authenticity of the API using a cryptographic hash; and
   enabling the devOp user computer to consume the available API in the catalog of API interfaces and method calls.

11. The system of claim 1, further comprising an API gateway configured to provide an interface through which the devOp user computer accesses the available API.

12. A method using an API design module and a NFT generator module to generate nonfungible tokens (NFTs) corresponding to application programmer interfaces (APIs) accessed by a devOp user computer, the method comprising:
   search, by the API design module, a computer network for APIs;
   populate, by the API design module, a repository with a catalog of API interfaces and method calls;
   lookup, by the NFT generator module, an available API on the computer network by accessing the catalog in the repository;
   mine, by the NFT generator module, metadata associated with the available API;

convert, by the NFT generator module, the available API and the associated metadata into a sequence of characters;

create, by the NFT generator module, a NFT based on the sequence of characters, wherein the sequence of characters is unique;

submit, by the NFT generator module, the NFT to a blockchain network for addition of the NFT to a blockchain; and consume, by the devOp user computer, in a secure manner the available API authenticated by the NFT.

13. The method of claim 12, wherein the consuming, by the devOp user computer, the available API comprises:

requesting access to the available API by accessing the NFT associated with the available API;

certifying authenticity of the available API using a cryptographic hash; and after the certifying, enabling the devOp user computer to consume the available API in the catalog of API interfaces and method calls.

14. The method of claim 12, further comprising updating, by the API design module, the catalog by removing those API interfaces and method calls that are associated with a known malicious actor.

15. The method of claim 12, further comprising generating, by the NFT generator module, a cryptographic hash used to certify and authenticate the available API, wherein the blockchain is a digital distributed ledger, and wherein the NFT is an identifiable data block stored on the blockchain to certify that the available API is authentic.

16. The method of claim 12, wherein the NFT associated with the available API comprises the associated metadata of the available API, and wherein the associated metadata defines technical function and operation of the available API.

17. The method of claim 16, wherein the associated metadata comprises API name, service protocol, and architectural design format of the available API, and wherein the architectural design format of the available API is one of SOAP, REST, and EVENT.

18. A non-transitory, tangible computer medium storing computer-executable instructions that, when executed by one or more processors, cause a system to:

search, by an application programmer interface (API) design module in the system, a computer network for APIs;

populate, by the API design module, a repository with a catalog of API interfaces and method calls;

lookup, by a nonfungible token (NFT) generator module in the system, an available API on the computer network by accessing the catalog in the repository;

mine, by the NFT generator module, metadata associated with the available API;

convert, by the NFT generator module, the available API and the associated metadata into a sequence of characters;

create, by the NFT generator module, a NFT based on the sequence of characters, wherein the sequence of characters is unique;

submit, by the NFT generator module, the NFT to a blockchain network for addition of the NFT to a blockchain;

request access to the available API by accessing the NFT associated with the available API;

onboard the available API using the NFT; and consume, by a devOp user computer, in a secure manner the available API authenticated by the NFT.

19. The non-transitory, tangible computer medium of claim 18, further storing computer-executable instructions that, when executed by the one or more processors, cause the system to generate, by the NFT generator module, a cryptographic hash used to certify and authenticate the available API, wherein the blockchain is a digital distributed ledger, and wherein the NFT is an identifiable data block stored on the blockchain to certify that the available API is authentic.

20. The non-transitory, tangible computer medium of claim 18, wherein the NFT associated with the available API comprises the associated metadata of the available API, and wherein the associated metadata defines technical function and operation of the available API, and wherein the associated metadata comprises API name, service protocol, and architectural design format of the available API.

* * * * *